United States Patent [19]

Tresch et al.

[11] Patent Number: 4,470,663
[45] Date of Patent: Sep. 11, 1984

[54] BICYCLE SPOKE REFLECTOR ASSEMBLY

[76] Inventors: Anna Tresch; Hans Kessler, both of 1624 N. 5 Ave., Phoenix, Ariz. 85003

[21] Appl. No.: 464,051

[22] Filed: Feb. 4, 1983

[51] Int. Cl.³ .............................................. G02B 5/12
[52] U.S. Cl. ...................................... 350/99; 350/97; 301/37 SA
[58] Field of Search ................ 301/37 SA; 350/97, 99

[56] References Cited

U.S. PATENT DOCUMENTS

| | | | |
|---|---|---|---|
| 3,894,786 | 7/1975 | Nagel | 350/99 |
| 3,924,928 | 12/1975 | Trimble | 350/99 |
| 3,950,076 | 4/1976 | Carlson | 350/97 |
| 3,967,879 | 7/1976 | Tsuyama | 350/99 |

Primary Examiner—Bruce Y. Arnold
Assistant Examiner—William Propp
Attorney, Agent, or Firm—Harry M. Weiss

[57] ABSTRACT

A bicycle spoke reflector assembly is disclosed for use with a bicycle tire assembly. The spoke reflector comprises a structural base member which includes a light reflector thereon. Attaching means includes at least two through members which define spoke channels disposed in relation to the structural member at angles corresponding to the angle defined by at least two spokes, for slidably engaging the structural member. Ornamental display means are provided to removably engaging the structural element for displaying personalized indicia.

2 Claims, 5 Drawing Figures

U.S. Patent  Sep. 11, 1984  4,470,663
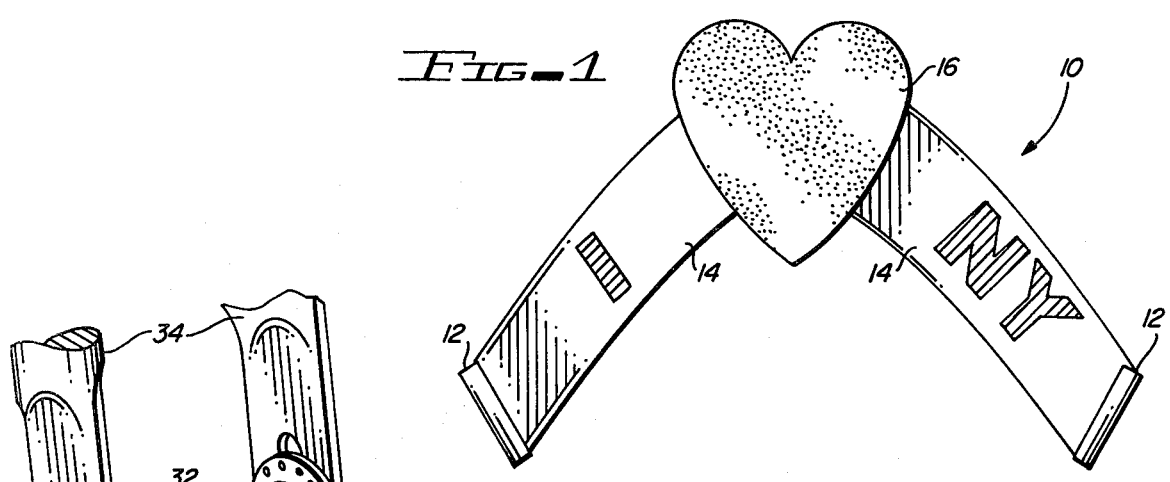
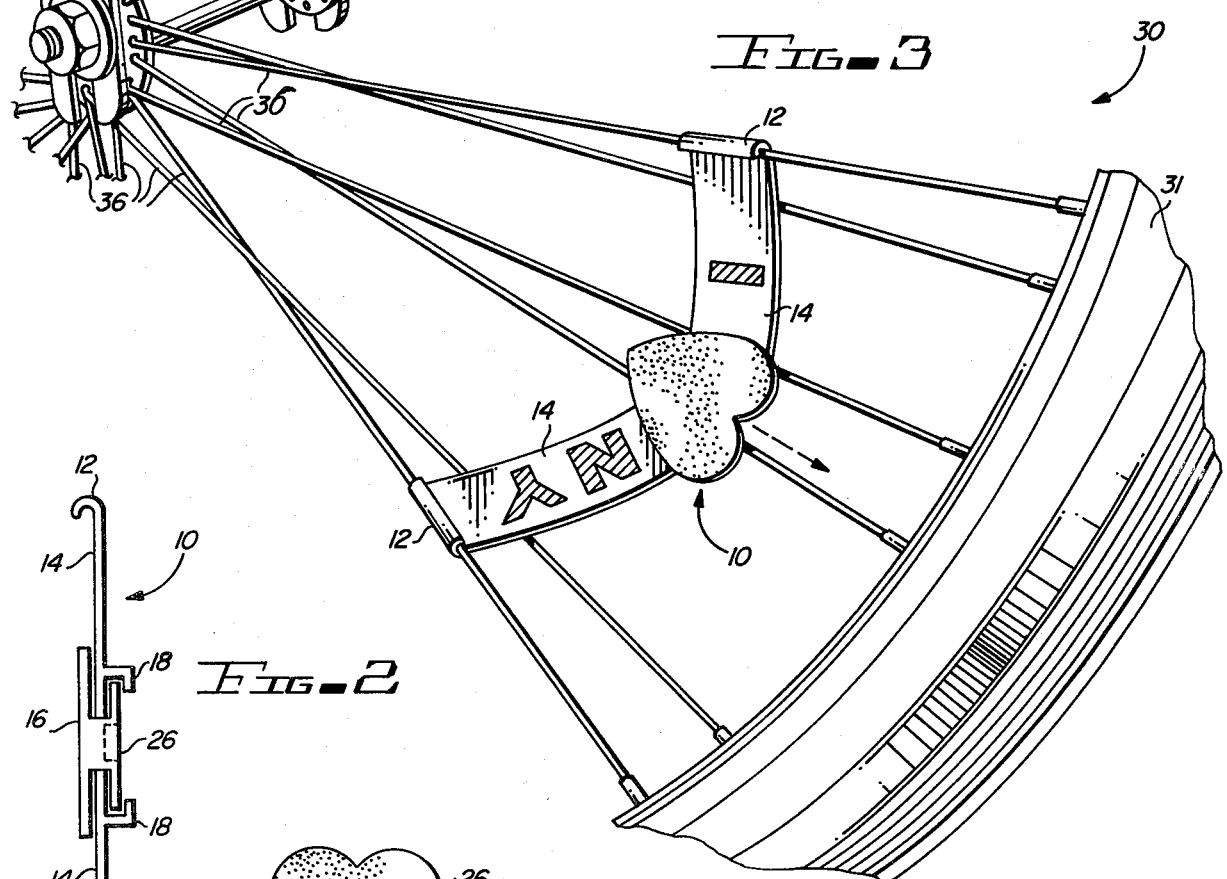
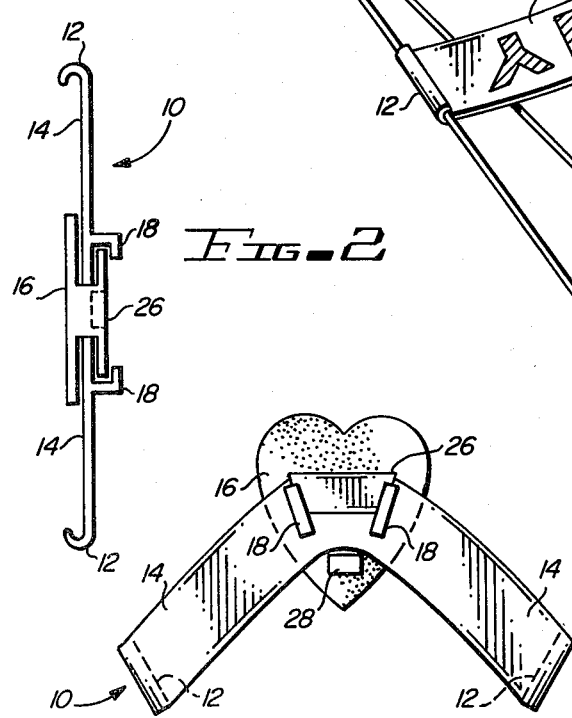
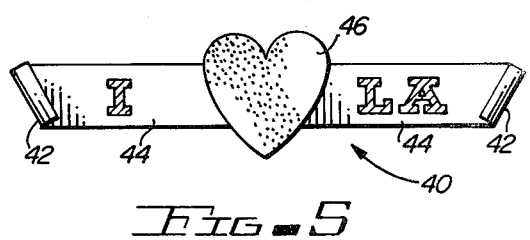

BICYCLE SPOKE REFLECTOR ASSEMBLY

BACKGROUND OF THE INVENTION

1. Field of the Invention

This invention relates generally to bicycle spoke reflectors and, more specifically, to a bicycle spoke reflector which includes means for quickly attaching and detaching the reflector to the spokes and personalized messages to the reflector.

2. Description of the Prior Art

Bicycling is increasingly being enjoyed by many as a form of exercise and recreation, as well as being an inexpensive means of transportation. As a result, increasing numbers of bicyclists now share the road with motorists leading to a corresponding increase in the number of automobile/bicycle collisions in recent years. A major cause for these collisions is the motorist's lack of awareness of the bicycle, because they are not looking for or do not expect the bicyclist on the road, or they otherwise do not see the bicyclist. The problems faced by the bicyclist are accentuated at night when it becomes even more difficult for motorists to see the bicycle.

Reflectors generally help to mitigate the problem of a motorist not being able to see the bicycle at night. This is particularly true of reflectors placed on the spokes of the bicycle because of the rotational movement of the wheel. Many bicycles however are not sold with bicycle spoke reflectors, thereby leaving it to the concerned bicyclist to make such provisions. Furthermore, even when such reflectors are provided, they often must be, or are desired to be replaced, as for example when the reflector portion is damaged.

In the past bicycle spoke reflectors were often difficult and time consuming to attach and detach. Such difficulty undoubtedly resulted in much fewer bicyclists using bicycle spoke reflectors than may otherwise have been the case if an easily affixed reflector had been available. Most prior art type bicycle spoke reflectors utilized nuts and bolts, or utilized extremely small, or otherwise hard to work with, hooking devices as the means for attaching the reflector to the spokes of the rim. These prior art reflectors did not adequately fill the need for a secure but easily affixed bicycle spoke reflector.

A need thus existed for a bicycle spoke reflector with an attaching means so simple and convenient to employ that all bicyclists would be encouraged to use and properly repair or replace these reflectors.

Further, once the prior art type reflector was attached, there was no means available for readily changing the reflector to provide for various shapes of messages to be incorporated with the reflector. Many bumper stickers have been utilized on motor vehicles by motorists to reflect the personality of the owner. Previous means for providing notes of personality on bicycles consisted primarily of personalized miniature license plates which were attached to the seat of the bicycle. However, the license plates were not readily changeable.

Thus, a further need existed for providing a means for readily attaching and detaching personalized notes or other indicia to visible portions of a bicycle.

SUMMARY OF THE INVENTION

It is an object of the present invention to provide an improved bicycle spoke reflector.

It is another object to provide an improved means for attaching a bicycle spoke reflector to the spokes of a bicycle.

It is yet another object to provide an improved attaching means in which the bicycle spoke reflector slides on to the desired spokes and requires no parts or tools for attachment.

It is still another object to provide a bicycle spoke reflector that is highly visible and capable of displaying personalized notes, phrases or symbols.

It is still further an object to provide a bicycle spoke reflector wherein the personalized note, phrase or symbol can be readily changed.

The above and other objects are achieved by a bicycle spoke reflector for use with a bicycle tire assembly having spokes axially spaced around a central spindle and extending radially to a rim assembly, comprising:

a structural base member having means for reflecting light; and attaching means including at least two through members which define spoke channels disposed in relation to the structural member at angles corresponding to the angle defined by at least two spokes, for slidably engaging the structural member, further comprising an ornamental display means removeably engaging the structural element for displaying personalized indicia wherein the ornamental display means comprises:

plural slide channels mounted on the structural members;

a backing plate coupled to the element and slidably engaging the slide channels; and block means for preventing the backing plate from disengaging the slide channels.

The foregoing and other objects, features and advantages will be apparent from the following, more particular, description of the preferred embodiments of the invention, as illustrated in the accompanying drawings.

BRIEF DESCRIPTION OF THE DRAWINGS

FIG. 1 is a planar view of the disclosed bicycle spoke reflector with an ornamental element coupled thereto.

FIG. 2 is a top view of the bicycle spoke reflector of FIG. 1 which more clearly shows the attaching means.

FIG. 3 is a perspective view of the bicycle spoke reflector shown above attached or engaged to the spokes of a bicycle wheel.

FIG. 4 is a back view of the bicycle spoke reflector shown above showing one method of affixing the ornamental element thereon.

FIG. 5 is a planar view of an alternate embodiment of the above shown disclosure.

THE SPECIFICATION

Referring to FIGS. 1 and 2, a bicycle spoke reflector is generally designated by the reference number 10. The preferred embodiment discloses a curved or arced structural member 14 and means for attaching the structural member 14 to spokes of a tire assembly. The structural member either is itself, or has thereon, some reflective means for alerting motorists of the presence of the bicycle. The attaching means comprises at least two elongated through members defining a spoke channels 12 and are preferably located at both ends of the structural member 14. The elongated through members 12 should be of such a size and disposed at such an angle with respect to the structural member 14 to ensure engaging the spokes 36 of the tire assembly 36 to the structural member 14. The structural member 14 and attaching means 12 can be coupled together, such as by glue, or can be formed as one integral unit (see FIG. 2).

Referring now to FIG. 3, a bicycle front tire assembly 30 is shown to include in part forks 34, a center spindle 32 coupled to the forks 34, a rim assembly 31, and spokes 36 running from the center spindle 32 to the rim assembly 31. The spokes 36 are generally disposed at equal angles with respect to each other radially around the circumference of the spindle 32. The bicycle spoke reflector 10 is aligned with at least two of the spokes 36 and pulled outwardly toward the tire and rim assembly 31 until the attaching means 12 securely engages the spokes 36. It may be necessary to manufacture a different bicycle spoke reflector 10 for each different tire size to ensure that the angle of the attaching means 12 corresponds to that of the equally angled spokes 36. An alternate solution is to have an attaching means 12 variably angled, such as by pivotally mounting it on the structural member 14, so as to adapt to differing tire sizes.

Referring to FIGS. 1-4, an ornamental element 16 may be added to the bicycle spoke reflector 10 if so desired. Such an ornamental element 16 would preferably be removeable, providing means for the bicycling enthusiast to periodically change the element to allow for the display of numerous personal notes, symbols or other indicia. This end could be accomplished by having attaching means, such as slide channels 18, into which a backing plate 26 on the ornamental element 16 slidably engages. A stop block 28 must be pulled outwardly before the ornamental element 16 can be removed, thereby preventing the backing plate 26 from accidentally disengaging the slide channels 18. A bicycle spoke reflector which is both easy to employ and clever in design, such as this disclosure, should greatly encourage a wider use of such reflectors.

The stylized I LOVE NY of Figures 1 and 3 is a registered trademark. Its use in the Figures is intended solely to display the invention. The use of the trademark in this patent is not in connection with the sale, offering for sale, distribution, or advertising of any goods or services.

Referring to FIG. 5, an alternate embodiment of the bicycle spoke reflector 40 is disclosed employing a linear structural member 44 and attaching means 42 which are not perpendicular with the structural member.

The function of this alternate embodiment is essentially the same however as that which was previously more fully described, and several similar minor alterations could be made without changing the scope of the invention.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A bicycle spoke reflector for use with a bicycle tire assembly having spokes axially spaced around a central spindle and extending radially to a rim assembly comprising:
   a structural base member having means for reflecting light;
   ornamental display means removeably engaging said structural base member for displaying personalized indicia, said ornamental display means including plural slide channels mounted on said structural base member, a backing plate slidably engaging said slide channels, and block means for preventing said backing plate from disengaging said slide channels; and
   attachment means for attaching said structural base member to said spokes including at least two attaching members which define spoke channels disposed in relation to said structural base member at angles corresponding to an angle defined by at least two of said spokes.

2. A bicycle spoke reflector for use with a bicycle tire assembly having spokes axially spaced around a central spindle and extending radially to a rim assembly comprising:
   a structural base member having means for reflecting light;
   ornamental display means removeably engaging said structural base member for displaying personalized indicia, said ornamental display means including plural slide channels mounted on said structural base member, a backing plate slidably engaging said slide channels, and block means for preventing said backing plate from disengaging said slide channels; and
   attachment means including at least two through members which define spoke channels disposed in relation to the structural member at angles corresponding to the angle defined by at least two spokes, for slidably engaging said structural base member to said spokes.

* * * * *